United States Patent
Seo et al.

(10) Patent No.: US 10,739,738 B2
(45) Date of Patent: Aug. 11, 2020

(54) METHOD AND APPARATUS FOR MANAGING HEATING, VENTILATION, AND AIR CONDITIONING

(71) Applicant: Samsung Electronics Co., Ltd., Gyeonggi-do (KR)

(72) Inventors: Sungmok Seo, Gyeonggi-do (KR); Dong Seop Lee, Gyeonggi-do (KR); Chungsuk Han, Gyeonggi-do (KR); Kwanwoo Song, Gyeonggi-do (KR); Hyejung Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 164 days.

(21) Appl. No.: 14/877,277

(22) Filed: Oct. 7, 2015

(65) Prior Publication Data
US 2016/0097556 A1    Apr. 7, 2016

(30) Foreign Application Priority Data

Oct. 7, 2014    (KR) .......................... 10-2014-0134742

(51) Int. Cl.
  *G05B 15/02*    (2006.01)
  *F24F 11/30*    (2018.01)
  (Continued)

(52) U.S. Cl.
  CPC .............. *G05B 15/02* (2013.01); *F24F 11/30* (2018.01); *F24F 11/62* (2018.01);
  (Continued)

(58) Field of Classification Search
  CPC ................................ F24F 11/006; G05B 15/02
  (Continued)

(56) References Cited

U.S. PATENT DOCUMENTS

| 6,223,544 B1 | 5/2001 | Seem |
| 6,968,295 B1 * | 11/2005 | Carr ........................ G06Q 10/06 700/286 |

(Continued)

FOREIGN PATENT DOCUMENTS

| CN | 101457968 | 6/2009 |
| CN | 103221755 | 7/2013 |

(Continued)

OTHER PUBLICATIONS

Erickson et al., "POEM: Power-efficient Occupancy-based Energy Management System", ACM, 2013, 14pg.*

(Continued)

*Primary Examiner* — Ryan D. Coyer
(74) *Attorney, Agent, or Firm* — The Farrell Law Firm, P.C.

(57) ABSTRACT

A method for managing an air conditioner is provided. The method includes determining a power consumption pattern of the air conditioner while controlling the air conditioner, based on at least one power consumption factor, calculating a threshold value of power consumption according to an operating time of the air conditioner based on distribution information of the determined power consumption pattern, determining whether a current power consumption is within a threshold value range of the calculated threshold value of power consumption, and generating and transmitting a signal to a manager server if the current power consumption is not within the threshold value range.

22 Claims, 10 Drawing Sheets

(51) Int. Cl.
*F24F 11/62* (2018.01)
*G06Q 10/06* (2012.01)
*G05B 23/02* (2006.01)
*F24F 140/60* (2018.01)
*F24F 11/64* (2018.01)
*F24F 11/58* (2018.01)
*F24F 11/46* (2018.01)
*G06Q 50/06* (2012.01)

(52) U.S. Cl.
CPC ..... *G05B 23/0235* (2013.01); *G06Q 10/0639* (2013.01); *F24F 11/46* (2018.01); *F24F 11/58* (2018.01); *F24F 11/64* (2018.01); *F24F 2140/60* (2018.01); *G06Q 50/06* (2013.01); *Y02P 90/82* (2015.11)

(58) Field of Classification Search
USPC ........................................................ 700/276
See application file for complete search history.

(56) References Cited

U.S. PATENT DOCUMENTS

| | | | |
|---|---|---|---|
| 9,188,508 B1* | 11/2015 | Meyer | G01M 3/2815 |
| 2007/0050221 A1* | 3/2007 | Singh | G05B 23/0283 |
| | | | 705/7.24 |
| 2008/0154387 A1 | 6/2008 | Nambu | |
| 2009/0240381 A1* | 9/2009 | Lane | H02J 3/14 |
| | | | 700/296 |
| 2012/0247748 A1 | 10/2012 | Mise et al. | |
| 2013/0214598 A1* | 8/2013 | Burke | G05B 15/02 |
| | | | 307/31 |
| 2013/0268126 A1* | 10/2013 | Iwami | F24F 11/0086 |
| | | | 700/276 |
| 2014/0018967 A1 | 1/2014 | Sako et al. | |
| 2014/0052304 A1 | 2/2014 | Vuppala et al. | |
| 2014/0089029 A1* | 3/2014 | Belur | G06Q 10/1097 |
| | | | 705/7.21 |
| 2014/0114610 A1 | 4/2014 | Sako et al. | |
| 2014/0115357 A1* | 4/2014 | Li | G06F 1/3234 |
| | | | 713/320 |
| 2014/0142875 A1* | 5/2014 | Burke | G01D 4/002 |
| | | | 702/60 |
| 2014/0316581 A1* | 10/2014 | Fadell | F24F 11/0009 |
| | | | 700/276 |
| 2014/0316584 A1* | 10/2014 | Matsuoka | G05D 23/1917 |
| | | | 700/278 |
| 2015/0372834 A1* | 12/2015 | Karp | G05B 15/02 |
| | | | 700/276 |
| 2016/0033946 A1* | 2/2016 | Zhu | G05B 15/02 |
| | | | 700/275 |

FOREIGN PATENT DOCUMENTS

| | | |
|---|---|---|
| CN | 103543325 | 1/2014 |
| CN | 104949291 | 9/2015 |
| CN | 105139157 | 12/2015 |
| EP | 2169328 | 3/2010 |
| JP | 3549710 | 8/2004 |
| JP | 2008-160991 | 7/2008 |
| JP | 2011-018110 | 1/2011 |
| JP | 2013-175015 | 9/2013 |
| JP | 2014-086890 | 5/2014 |
| KR | 1020130117188 | 10/2013 |
| KR | 1020130118472 | 10/2013 |

OTHER PUBLICATIONS

Harvey, L. D., "Reducing energy use in the buildings sector: measures, costs, and examples", Springer, 2009, 25pg.*
Joern Ploennigs et al., "Exploiting Generalized Additive Models for Diagnosing Abnormal Energy Use in Buildings", IBM Research, 2013, 8 pages.
International Search Report dated Jan. 20, 2016 issued in counterpart application No. PCT/KR2015/010564, 3 pages.
European Search Report dated Sep. 20, 2017 issued in counterpart application No. 15849365.0-1602, 7 pages.
Chinese Office Action dated May 28, 2019 issued in counterpart application No. 201510645349.5, 19 pages.
Japanese Office Action dated Jul. 8, 2019 issued in counterpart application No. 2017-518961, 6 pages.
Examination of patent validity, LG Electronics EMS (energy mgmt. solution) outline, https://www.lge.co.kr/kr/business/contents/energy/ems-main.do?code=ems01, Dec. 23, 2019.

* cited by examiner

METHOD AND APPARATUS FOR MANAGING HEATING, VENTILATION, AND AIR CONDITIONING

PRIORITY

This application claims priority under 35 U.S.C. § 119(a) to Korean Patent Application Serial No. 10-2014-0134742, which was filed in the Korean Intellectual Property Office on Oct. 7, 2014, the entire disclosure of which is incorporated herein by reference.

BACKGROUND

1. Field of the Invention

The present invention relates generally to a method and an apparatus for managing heating, ventilation, and air conditioning, and more particularly, to a method and an apparatus for managing heating, ventilation, and air conditioning by monitoring power consumption in a building.

2. Description of the Related Art

The Internet is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" are in high demand for IoT implementation, a sensor network, a Machine-to-Machine (M2M) communication, Machine Type Communication (MTC), and so forth have been recently undergoing research and development.

Such an IoT environment may provide intelligent Internet technology services that are of new value to human life by collecting and analyzing data generated among connected things. IoT technology may be applied to a variety of fields and concepts including smart homes, smart buildings, smart cities, smart cars or connected cars, smart grids, health care, smart appliances and advanced medical services through convergence and combination between existing Information Technology (IT) and various industrial applications.

In the meantime, conventional managing equipment in a building includes technologies for managing an air conditioner in a building, indoor air quality monitoring equipment, and lighting equipment. Among these, the air conditioner is the piece of equipment most closely related to the comfort requirement of the occupants in a building. Thus the management of the air conditioner is very important. Therefore, in order to avoid the discomfort of occupants due to troubles with the air conditioner, a method and an apparatus for preventing a malfunction of the air conditioner by monitoring power consumption of the air conditioner is required.

SUMMARY

The present invention has been made to address at least the above mentioned problems and/or disadvantages and to provide at least the advantages described below.

According to an aspect of the present invention, a method and an apparatus for managing an air conditioner is provided. The method and apparatus predicts power consumption and a threshold range of the air conditioner by considering various factors influencing the power consumption of the air conditioner, and monitors the power consumption of the air conditioner to identify whether the current power consumption is within the predicted threshold range.

In accordance with an aspect of the present invention, there is provided a method for managing an air conditioner. The method includes determining a power consumption pattern of the air conditioner while controlling the air conditioner, based on at least one power consumption factor, calculating a threshold value of power consumption according to an operating time of the air conditioner based on distribution information of the determined power consumption pattern, determining whether a current power consumption is within a threshold value range of the calculated threshold value of power consumption, and generating and transmitting a signal to a manager server if the current power consumption is not within the threshold value range.

In accordance with another aspect of the present invention, there is provided an apparatus for managing an air conditioner. The apparatus includes a communication unit configured to transmit and receive information to/from another apparatus in a system, and a control unit configured to determine a power consumption pattern of the air conditioner while controlling the air conditioner, based on at least one power consumption factor, to calculate a threshold value of power consumption according to an operating time of the air conditioner based on distribution information of the determined power consumption pattern, to determine whether a current power consumption is within a threshold value range of the calculated threshold value of power consumption if a time point to control the air conditioner is reached, and to generate and transmit a signal to a manager server if the current power consumption is not within the threshold value range.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION

Figure 1:
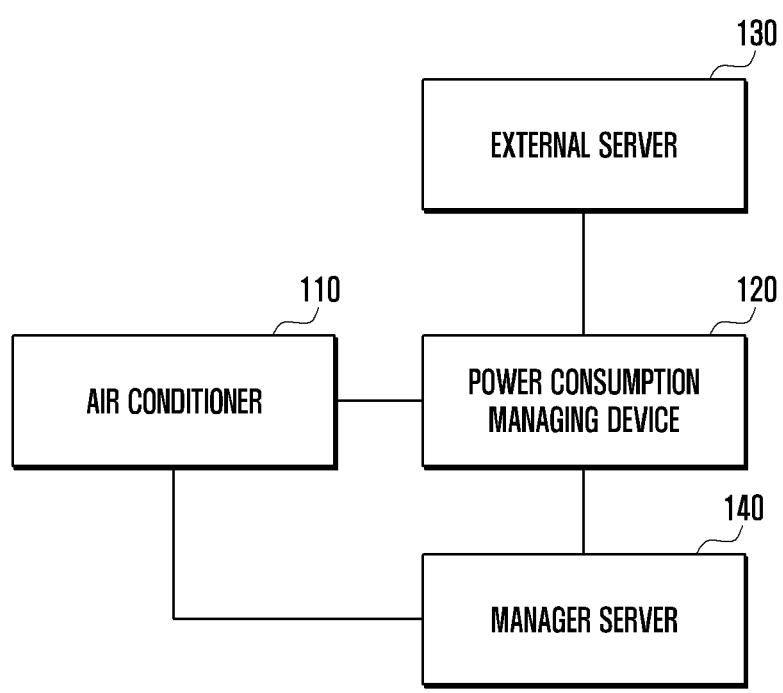
FIG. 1 is a diagram illustrating a configuration of a system for managing power consumption, according to an embodiment of the present invention.

Hereinafter, embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the invention.

Some components in the accompanying drawings are emphasized, omitted, or schematically illustrated, and the size of each component does not fully reflect the actual size. Therefore, the present invention is not limited to the relative sizes and distances illustrated in the accompanying drawings.

The following description with reference to the accompanying drawings is provided to assist in a comprehensive understanding of various embodiments of the present invention as defined by the claims and their equivalents. It includes various specific details to assist in that understanding but they are to be regarded as mere examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to dictionary meanings, but are merely used to enable a clear and consistent understanding of the present invention. Accordingly, it should be apparent to those skilled in the art that the following description of various embodiments of the present disclosure is provided for illustrative purposes only and not for the purpose of limiting the present invention as defined by the appended claims and their equivalents.

Here, it should be understood that each block in the flowcharts described herein, and their combinations, can be executed by one or more computer program instructions. The computer program instructions can be executed on a general purpose computer, special computer, or processor of programmable data processing equipment. The computer program instructions can be stored in a computer, programmable data processing equipment, or non-transitory computer readable media. The computer program instructions can be used for manufacturing a product.

Further, each block of the flowcharts described herein may indicate a module, segment, or portion of a code including at least one executable instruction for performing a specific logical function(s). The logical function(s) can be generated in different sequences. For example, two adjacent blocks can be executed at the same time or at different times according to the specific logical function(s).

The present invention relates to a sensor network, MTC, M2M communication, and technology for IoT. The present invention may be applied to intelligent services based on the above technologies, such as smart home, smart building, smart city, smart car, connected car, health care, digital education, smart retail, security and safety services.

The term 'unit' used herein can mean software or hardware components such as a Field Programmable Gate Array (FPGA) or an Application-Specific Integrated Circuit (ASIC), and the 'unit' takes a specific role. However, the 'unit' is not limited to software or hardware. The 'unit' may be configured to be included in addressable storage media or to operate at least one processor. For example, the 'unit' may include software components, object-oriented software components, class components, task components, processes, functions, attributes, procedures, subroutines, segments of a program code, drivers, firmware, microcode, circuits, data, database, data structures, tables, arrays, and variables. The components and functions provided in the 'unit' can be combined to a smaller number of components or divided into a larger number of components, and additional components may be included. Further, the components and the units may be configured to operate at least one central processing unit (CPU) in a device or a security multimedia card.

FIG. 1 is a diagram illustrating a configuration of a system for managing power consumption, according to an embodiment of the present invention.

The system for managing power consumption includes an air conditioner 110, a power consumption managing device 120, an external server 130, and a manager server 140.

The air conditioner 110, namely, HVAC (Heating, Ventilation, and Air Conditioning) corresponds to a conventional air conditioner. The air conditioner 110 is used for heating, ventilating, and air conditioning. The air conditioner 110 may include warm heating source equipment and cold heating source equipment. As an example of the warm heating source equipment, a boiler is used and warm air can be prepared by supplying warm water or steam generated from the boiler to a heating coil in the air conditioner 110. As an example of the cold heating source equipment, a refrigerator is used and cold air can be prepared by supplying cold water generated from the refrigerator to the air conditioner 110. The air conditioner 110 may include a cooling tower, cold water pump, boiler water supply pump, and affiliated piping as auxiliary equipment of the warm heating source equipment and the cold heating source equipment.

The air conditioner 110 is connected to the power consumption managing device 120 and transmits current operating state information of the air conditioner 110 to the power consumption managing device 120. The current operating state information is used by the power consumption managing device 120 for predicting or determining power consumption of the air conditioner 110. The current operating state information of the air conditioner may include temperature setting information of an air conditioning cycle and/or of an air conditioner.

The power consumption managing device 120 may include an air conditioner managing device to control the power consumption of the air conditioner 110.

The power consumption managing device 120 can manage power consumption of equipment in a building such as a lighting device and a display device. With respect to lighting, electric power monitoring for a combined space and an on time of a fluorescent bulb, incandescent bulb, and LED (Light Emitting Diode) is possible. A location where a problem is present with regard to a specific lighting can be easily found, because a state of LED lighting can be easily identified by using an LED lighting device having a visible light communication function. With regard to a display, a normal state can be identified based on a wave pattern of electric power (e.g., delay of electric power value and peak point) when the power of a specific screen is switched on/off, or if synchronization is not well matched in a large monitor, such as an LFD (Large Format display).

The power consumption managing device 120 communicates with the air conditioner 110, external server 130, and manager server 140 for transmission of required information and can manage power consumption of the air conditioner 110. The power consumption managing device 120 can calculate a threshold value of power consumption according to an operating time of the air conditioner 110 by using a power consumption factor received from the external server 130 and a power consumption pattern based on the power consumption factor. The power consumption factor is a factor which influences the power consumption of the air conditioner 110. The power consumption factor is not a unit associated with particular air conditioners and can be determined according to a space where the air conditioner 110 is installed.

For example, the power consumption factor may include electric power data, building space property information, building space variable information, and weather data. The electric power data is information related to electric power and may include power consumption for each space in a building or dwelling (hereinafter "building") and power consumption for each air conditioner located in a building. Further, the electric power data can be provided from actual data previously measured and pre-stored in the external server 130.

The building space property information is a relative value of a building characteristic, and may be pre-stored in the external server 130. The building space property information may include sizes and locations of spaces, types and number of air conditioners, and initial performance of an air conditioner.

The building space property information may vary according to a time elapse in a building space and may include statistical information generated by accumulating data previously obtained. The building space variable information may include an occupant pattern, temperature setting schedule, average indoor temperature and humidity, and average indoor air quality.

The weather data is weather information relating to an external environment of a building. The weather data can be received from the external server 130, and the external server 130 may include a meteorological server. The weather data may include past weather data and weather data at a time of managing the current power consumption. Further, the power consumption managing device 120 can calculate a threshold value of power consumption based on the power consumption factor as the information of power consumption factor becomes more abundant. Accordingly, if the power consumption factor for 1 month is currently stored in the external server 130, information for a 1 year period can be modeled in order to increase the accuracy of management of power consumption of the air conditioner 110. The modeling can be performed by using a BIM (Business Information Modeling).

Further, the power consumption managing device 120 can predict or determine power consumption of the air conditioner 110 by using power consumption patterns corresponding to each power consumption factor received from the external server 130. The information is generated based on electric power data corresponding to the power consumption factor. The power consumption pattern is based on a relationship between the power consumption factor and power consumption of the air conditioner 110. In order to explain the power consumption pattern based on a power consumption factor, an example is described by limiting the power consumption factor to building space variable information and weather data. The power consumption pattern based on a power consumption factor may include power consumption information versus time, wherein the power consumption can be related to a specific day of the week, a season of the year, e.g., summer, an indoor temperature 21° C. of the building, an ambient or outdoor temperature 18°, and occupants located in a specific space of the building, e.g., 8 persons. Accordingly, the power consumption managing device 120 can extract a daily power consumption pattern corresponding to a condition of each power consumption factor of the air conditioner 110 versus the time of controlling the air conditioner 110 from a plurality of power consumption patterns based on a power consumption factor for a year. The daily power consumption pattern versus the time of controlling the air conditioner 110 can be predicted based on a condition corresponding to each extracted power consumption factor. A power consumption factor having a high influence can be weighted by analyzing the influence to power consumption corresponding to each power consumption factor.

Further, the power consumption managing device 120 can manage power consumption of the air conditioner 110 based on a threshold value versus the time in the predicted power consumption pattern. The power consumption managing device 120 can manage the power consumption while controlling the air conditioner 110 by determining whether the power consumption is within a threshold value range versus the time of the predicted power consumption pattern when the time of controlling the air conditioner 110 is reached. The power consumption managing device 120 can generate a notice signal and transmit it to the manager server 140 if the current power consumption of the air conditioner 110 is not within the threshold value range of the predicted power consumption pattern.

Further, the power consumption managing device 120 can receive rate system information from the external server 130 and can calculate a time required for checking each air conditioner in a building. The power consumption managing device 120 can consider the current operating state received from the air conditioner 110. If the power consumption managing device 120 is required to check each air conditioner 110, the power consumption managing device 120 can generate a notice signal and transmit it to the manager server 140.

The manager server 140 can be a component of a device (e.g., a computing device including but not limited to, a smartphone, laptop, Personal Digital Assistant (PDA), etc.) of a user of the power consumption managing system and can receive an operating state of the power consumption managing system. The user can manage the air conditioner 110 by using the information provided in the notice signal transmitted to the manager server 140.

Figure 2:
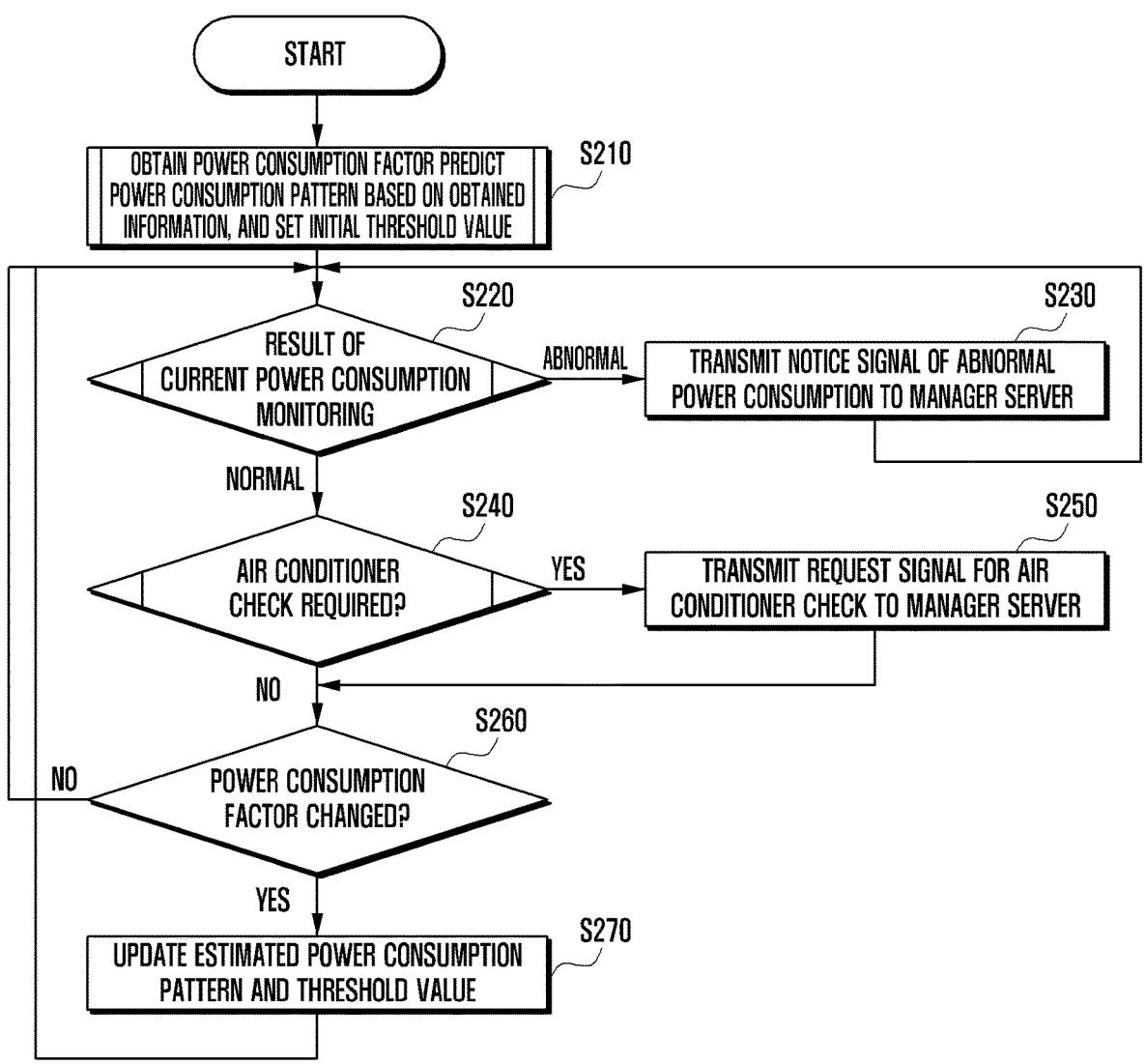
FIG. 2 is a flowchart illustrating a method of managing power consumption, according to an embodiment of the present invention.

FIG. 2 is a flowchart illustrating a method of managing power consumption, according to an embodiment of the present invention.

The power consumption managing device 120 obtains a power consumption factor, predicts a daily power consumption pattern versus the time of controlling the air conditioner 110 based on the obtained information, and calculates a threshold value according to the time of the predicted power consumption pattern at step S210. The power consumption managing device 120 can receive the power consumption factor from the external server 130. As described above, the power consumption factor influences power consumption of the air conditioner 110. The external server 130 can store the power consumption factor, receive the information by connecting to a separate server, and transmit the received information to the power consumption managing device 120. If a sufficient amount of power consumption factors are stored in the external server 130 (for example, if information more than for 1 year is stored in the external server 130), the power consumption managing device 120 can receive a power consumption factor.

Alternatively, instead of receiving a power consumption factor, the power consumption managing device 120 can directly generate a power consumption factor. The power consumption managing device 120 can generate a power consumption factor if sufficient power consumption factors are not stored (for example, if information less than for 1 year is stored in the external server 130), as will be described in more detail with respect to FIG. 3.

The power consumption managing device 120 can predict or determine a power consumption pattern of the air conditioner 110 based on the power consumption factor of the air conditioner 110 by using a sufficient amount of power consumption factors (for example, power consumption factors obtained for 1 year). The power consumption managing device 120 can predict the power consumption of the air conditioner 110 by using a relationship between at least one factor included in the obtained power consumption factors and power consumption information.

The power consumption managing device 120 can predict a daily power consumption pattern of the air conditioner 110 versus the time of controlling the air conditioner 110 by using at least one power consumption pattern received from the external server 130 corresponding to the power consumption factor. The power consumption pattern is defined as power consumption information versus the time corresponding to the plurality of power consumption factors. The power consumption managing device 120 can predict a daily power consumption pattern versus the time of controlling the air conditioner 110 by extracting a power consumption pattern from a plurality of power consumption patterns received from the external server 130 corresponding to each power consumption factor.

Further, the power consumption managing device 120 can calculate a threshold value versus the time of the predicted power consumption pattern of the air conditioner 110 based on at least one extracted power consumption pattern of the air conditioner 110. The threshold value versus the time of the power consumption pattern of the air conditioner may include the maximum and minimum values of the predicted power consumption. The power consumption managing device 120 can use power consumption distribution information according to an extracted time of the power consumption pattern of the air conditioner 110 (for example, standard deviation). Further, the power consumption managing device 120 can apply a weighted value when calculating the threshold value versus the time of the predicted power consumption pattern of the air conditioner by considering the influence to the power consumption corresponding to each power consumption factor, based on at least one extracted power consumption pattern of the air conditioner 110.

The power consumption managing device 120 determines a result of monitoring power consumption when the time for controlling the air conditioner 110 is reached at step S220. The power consumption managing device 120 can adjust the power consumption threshold value predicted based on the power consumption factor according to operating state information of each air conditioner in the building. Besides predicting or determining the power consumption of air conditioners in a building, the power consumption managing device 120 can accurately manage the power consumption of the air conditioners 110 by predicting or determining power consumption of each air conditioner in the building.

The power consumption managing device 120 can determine whether the current power consumption of the air conditioner 110 is included within a predicted power consumption range based on the threshold value of power consumption versus the time of predicted power consumption pattern. Namely, the power consumption managing device 120 can determine whether the air conditioner 110 is currently operating in a normal condition (or state) based on the current power consumption of the air conditioner 110 and the threshold value of power consumption versus time. If the current power consumption of the air conditioner 110 is within a predicted power consumption range, the air conditioner 110 can be regarded as operating in a normal condition. If the current power consumption of the air conditioner 110 is greater than a maximum value of the predicted power consumption range or less than or equal to a minimum value of the predicted power consumption range, the air conditioner 110 can be regarded as operating in an abnormal condition. Further, the power consumption managing device 120 can monitor an IAQ (Indoor Air Quality) in a space where the air conditioner 110 is located and can monitor an influence that a ventilation control system has on the air conditioner, as will be described in more detail with reference to FIG. 4.

As described above, in predicting a threshold value of predicted power consumption of the air conditioner 110, the power consumption managing device 120 calculates a threshold value of power consumption based on distribution information versus the time of power consumption factor influencing the power consumption, which allows the power consumption managing device 120 to make a more accurate determination with regard to a condition, e.g., normal/abnormal, of the air conditioner 110, as opposed to using a fixed or specific threshold value (for example, ±10% of predicted power consumption). Further, threshold values versus individual spaces or the time can be set by applying various building property factors and building variable factors, which can change according to the time. Accordingly, the reliability of the power consumption managing device 120 can be increased in identifying whether the power consumption of the air conditioner 110 is in a normal condition or an abnormal condition.

If the abnormal condition of power consumption of the air conditioner 110 is detected at step S220, the power consumption managing device 120 transmits a signal of abnormal power consumption of the air conditioner 110 to the manager server 140 at step S230. Namely, as described above, a signal of an abnormal condition can be transmitted if the current power consumption of the air conditioner 110 is not within a threshold value range of the predicted power consumption of the air conditioner 110.

As a result of obtaining an abnormal condition signal, the manager server 140 can transmit, to the air conditioner 110, a command signal for decreasing or shutting down power provided to the air conditioner 110 or for increasing a power provided to the air conditioner 110, according to a predetermined algorithm. The manager server 140 can receive abnormal condition signal and can measure an abnormality level of the current power consumption of the air conditioner 110. The abnormality level may indicate, for example, that the air conditioner 110 is operating at a dangerous level. For example, if the current power consumption of the air conditioner 110 exceeds the maximum value, a difference between the current power consumption of the air conditioner 110 and the maximum value of the predicted power consumption can be calculated. Subsequently, the abnormality level can be measured according to the calculated difference and the threshold value range (i.e., a ratio to a difference between the maximum value and the minimum value). Hereafter, a unit of power consumption is omitted and simple numeric values are used for ease of understanding. For example, if the maximum value and the minimum value of the predicted power consumption of the air conditioner 110 are respectively 15 and 9, and the current power consumption of the air conditioner is 18, the difference between the current power consumption of the air conditioner 110 and the maximum value of the predicted power consumption becomes 3 and the difference between the maximum value and the minimum value becomes 6, which corresponds to ⅜*100=50%. Accordingly, the abnormal level can be digitized as 50%. Further the digitized percent can be managed by dividing it into several sections. For example, the digitized percent more than 70% is defined to the dangerous section.

If the measured abnormal level is less than a predetermined critical value, the manager server 140 can output a signal or a notice of abnormal power consumption of the air conditioner 110 to a manager (or user) of the air conditioner 110 so that the manager can take a proper action, i.e., increase or decrease power to the air conditioner 110. The signal or notice may include an alarm sound or an alarm message. If the measured abnormal level is greater than the predetermined critical value, the manager server 140 can output a notice to the manager so that the manager can control the air conditioner accordingly. Namely, if the current power consumption is greater than the maximum value of the predicted power consumption and the abnormality level exceeds a predetermined critical range, the air conditioner 110 can be protected by shutting down power supplied to the air conditioner 110.

The power consumption managing device 120 determines whether a check of the air conditioner 110 is required at step S240. The power consumption managing device 120 can determine whether the check of the current air conditioner 110 is required by comparing energy loss costs of a predetermined past reference day and a test day. The predetermined past reference day may include a time at which the air conditioner 110 was installed. Further, the energy loss cost of the test day can be calculated by comparing an electricity rate on the test day and an electricity rate on the reference day.

To determine if a check of an air conditioner 110 is required, the power consumption managing device 120 can extract rate system information (e.g., a cost of power or a rate at which power is calculated for the predetermined past reference day) from the external server 130. If the rate system information is different from the current rate system information, the electricity rate can be recalculated based on the current rate system information.

The power consumption managing device 120 can measure a similarity between a power consumption factor on the reference day and a power consumption factor on the test day. It is then determined whether the measured similarity exceeds a predetermined value and whether the test day and the past reference day are of similar conditions. Namely, if there is a big difference between the energy loss costs on the reference day and the test day (i.e., electricity rate), even though the test day and the past reference day are of similar conditions, the power consumption managing device 120 can determine that a check of the air conditioner 110 is required on the test day. When determining whether the electricity rates are different, the determination can be made by comparing a rate difference between the test day and the reference day with a check cost. Because it may be economical not to perform the check of an air conditioner 110 if the rate difference is not greater than the check cost, the power consumption managing device 120 may use the following determination method.

Differently from the above example, the check is conventionally performed based on a fixed check period such as, for example, 6 months or 1 year. Namely, the check is performed with a fixed check period according to information provided by the air conditioner 110 manufacturer, without considering an energy cost and a check cost due to performance deterioration of the air conditioner 110, and the check cost could not be optimized in the management of the air conditioner 110. As described above, by performing a check of the air conditioner 110 through the comparison of the rate difference between the past reference day and the test day with the check cost, the power consumption managing device 120 can perform the check for individual air conditioners 110 by reflecting differences of energy patterns in a building type, a space, and an air conditioner.

Further, the power consumption managing device 120 can determine if a check of the air conditioner 110 is required by applying information relating to a change of use of the building or if a rate system changes. Further, if a rate system for each time period is applied, a measured rate amount can be different even though the same amount of electric power is used with equipment having the same performance in a space, and thereby the check period of equipment can be set accordingly, as will be described in more detail with reference to FIG. 8.

If it is determined that the air conditioner 110 is to be checked at step S240, the power consumption managing device 120 transmits a signal requesting for a check of the air conditioner 110 to the manager server at step S250. According to the transmission of the request signal, the manager server 140 can output a notice to inform a manager or user of the air conditioner 110 that the check of the air conditioner 110 is required. The notice may include an alarm sound and an alarm message. With respect to an alarm sound or alarm message output from the manager server 140, the manager of the air conditioner 110 can take appropriate action, such as requesting for a check service to a manufacturer's server. Alternatively, the manager server 140 can directly transmit a signal requesting for a check service to the manufacturer's server without outputting a notice to the manager of the air conditioner 110. Additionally, the power consumption managing device 120 can continuously provide the manager of the air conditioner 110 with information of the current equipment condition at step S250, if a performance deterioration of the air conditioner 110 is generated. Further, the power consumption managing device 120 can store information of a check period, estimate an optimum check period for each air conditioner in the building, and transmit the estimated check period to the manager server 140.

The power consumption managing device 120 updates the predicted power consumption pattern and the threshold value of power consumption versus time, and determines whether the power consumption factor has changed at step S260. The power consumption managing device 120 can continuously receive operating state information from the air conditioner 110. Further, the power consumption managing device 120 can continuously receive a power consumption factor of the test day from the external server 130. If the current power consumption of the air conditioner 110 is different from the predicted power consumption of the air conditioner 110 generated while previously monitoring the power consumption of the air conditioner 110, the power consumption managing device 120 can determine if the power consumption factor has changed.

If the power consumption factor has changed at step S260, the power consumption managing device 120 updates the predicted power consumption pattern, which is used as the base for monitoring and the threshold value of power consumption versus time at step S270. The power consumption of the air conditioner 110 is predicted based on the changed power consumption factor of the air conditioner 110, and the update can be made by repeating the procedure of generating a threshold value of the predicted power consumption.

The power consumption managing device 120 can apply a weighted value to the power consumption factor when updating the threshold value of the predicted power consumption. The weighted value can be calculated by using a sensitivity test, which is known in the technical field of the present invention. The sensitivity test can be performed by analyzing a relationship between the power consumption factor and the power consumption, and apply a greater weight value for a factor giving a greater influence to the power consumption by analyzing sensitivities of individual factors or combinations of factors corresponding to a time period. For example, the sensitivity test can derive a result by using a PCA (Principal Component Analysis), ANOVA (Analysis of Variance), or SOM (Self-Organizing Map). Further, according to the change of the power consumption factor, a predetermined number of major power consumption factors for each space of the building can be extracted based on the calculated weighted value.

Further, the previously described IAQ monitoring and the result of a ventilation control can be applied to the change of power consumption factors. The power consumption managing device 120 can update the predicted power consumption and the threshold value of the power consumption by determining a change of power consumption factors (for example, change of a temperature or a humidity due to ventilation). Further, the power consumption managing device 120 can apply the weighted value considered in the process of updating to the following updating period. This is because the weighted value of the power consumption factor influencing the power consumption changes according to the repetition of monitoring and time.

Using known methods of calculating the threshold value of the power consumption for the air conditioner 110, the power consumption of the air conditioner 110 is managed by fixing the threshold value to a specific value, which can result in incorrectly determining if the air conditioner 110 is operating under a normal condition or under an abnormal condition, when considering various factors of power consumption of the air conditioner 110. In accordance with the present invention, the accuracy of determining if the air conditioner 110 is operating under a normal condition or an abnormal condition can be improved by calculating a threshold value of power consumption for the air conditioner 110 by considering the power consumption factor, calculating the threshold value of the power consumption according to a time period, identifying an operating condition of the air conditioner 110, and changing the power consumption and the threshold value according to the time and changes of power consumption factors for each space of the building.

Figure 3:
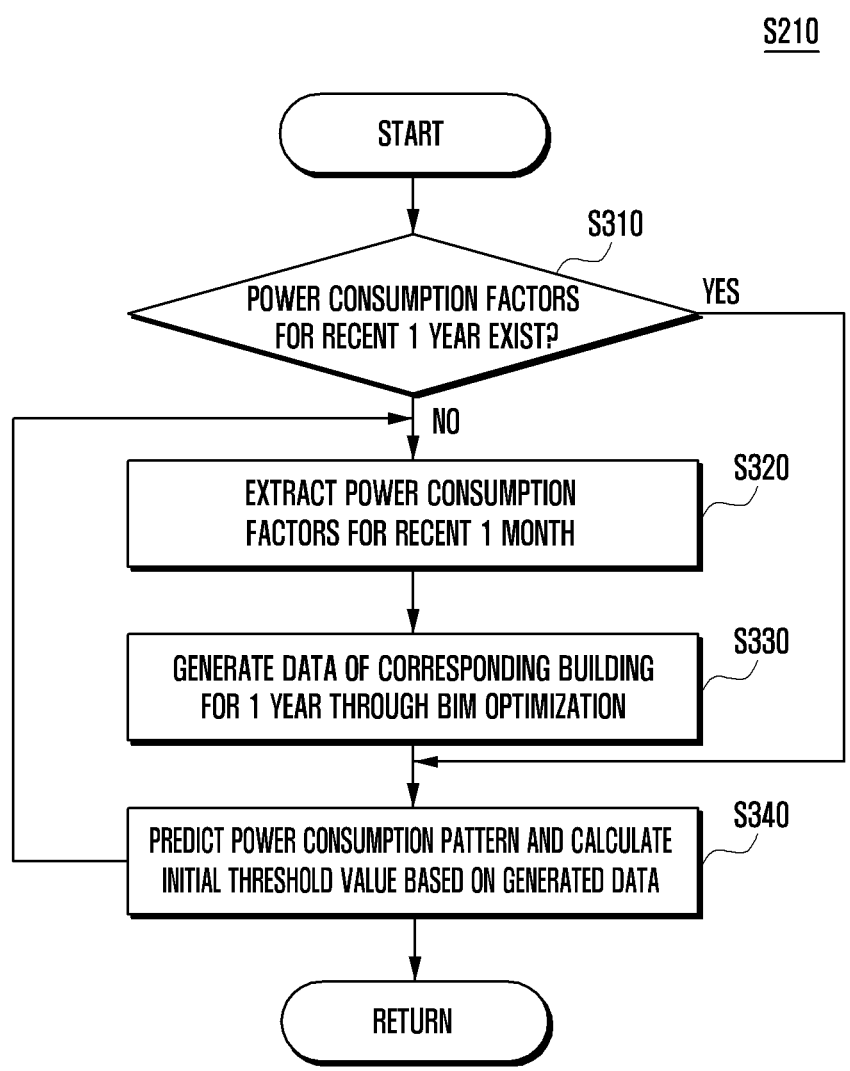
FIG. 3 is a flowchart illustrating a method of managing power consumption by a power consumption managing device, according an embodiment of the present invention.

FIG. 3 is a flowchart illustrating a method of managing power consumption by a power consumption managing device at step S210, according an embodiment of the present invention.

The power consumption managing device 120 identifies whether power consumption factors for the past 1 year are available at step S310. The power consumption managing device 120 can identify the amount of power consumption factors receivable from the external server 130 and can identify whether a predetermined minimum amount of information for the past 1 year are available in order to accurately predict the power consumption of the air conditioner 110.

If power consumption factors for the past 1 year are unavailable, the power consumption managing device 120 receives power consumption factors for a previous 1 month from the external server 130 at step S320. The received power consumption factors for the previous 1 month are used to generate information of power consumption factors for the past 1 year.

The power consumption managing device 120 can generate power consumption factors for the past 1 year of the corresponding air conditioner 110 in a building through a BIM (Building Information Modeling) optimization at step S330. BIM is a building information modeling technology which stores all the factors of the building and systematically synchronizes object management data of the building. Namely, BIM is a technology for integrating information such as the number of buildings, processes, and various analyses. The power consumption managing device 120 can generate information for the past 1 year of the corresponding building by modeling with all the pre-stored factors of the building for minimum of 1 month.

The power consumption managing device 120 predicts power consumption of each power consumption factor of the air conditioner 110 based on the generated power consumption factor, and calculates an initial threshold value of the power consumption at step S340. The power consumption managing device 120 can obtain power consumption patterns from an external device, e.g., a server, based on at least one power consumption factor. The power consumption managing device 120 can extract a power consumption pattern corresponding to the power consumption factor for the time of controlling the air conditioner 110 from the obtained power consumption patterns based on the power consumption factor. After extracting the power consumption pattern, an influence of the power consumption factor to the power consumption of the air conditioner 110 is considered based on the power consumption factor for the time of controlling the air conditioner 110.

Hereafter, it is assumed that the power consumption pattern corresponding to each power consumption factor for the time of controlling the air conditioner 110 is extracted from the obtained power consumption patterns for the past 1 year. For example, information of power consumption versus the time is first extracted corresponding to building space property information, which gives the greatest influence to the power consumption factor, then power consumption versus time is extracted based on weather data and related factors.

For example, the weather and date data are extracted in the order of extensity, and if the time for controlling the air conditioner 110 is weekdays in summer, power consumption patterns corresponding to the weekdays in summer are extracted from the extracted power consumption information, then power consumption patterns are extracted corresponding to the weather information such as a temperature and a humidity. Subsequently, at least one power consumption pattern is extracted corresponding to an occupant pattern or a temperature setting schedule pattern.

After extracting the power consumption pattern, the power consumption of the air conditioner 110 can be predicted corresponding to the time of controlling the air conditioner 110 by considering a weighted value in order for extracting and combining the extracted power consumption patterns.

Subsequently, the power consumption managing device 120 can calculate a threshold value versus time of the predicted power consumption pattern of the air conditioner 110 by analyzing distribution information versus time of at least one power consumption pattern corresponding to the time of controlling the air conditioner 110. For example, the distribution information may include a standard deviation. Further, the power consumption managing device 120 can obtain distribution information applied with a weighted value by considering influences of each power consumption factor to the power consumption, when calculating the threshold value versus time of power consumption pattern of the air conditioner 110 based on the extracted at least one power consumption pattern of the air conditioner.

Namely, the power consumption managing device 120 can calculate a power consumption pattern for the time of controlling the air conditioner 110 by considering weighted values for each power consumption factor based on the extracted at least one power consumption pattern and can calculate the maximum value by adding the standard deviation for the calculated time to a power consumption value corresponding to the time of the power consumption pattern and the minimum value by subtracting the standard deviation from the power consumption value.

Figure 4:
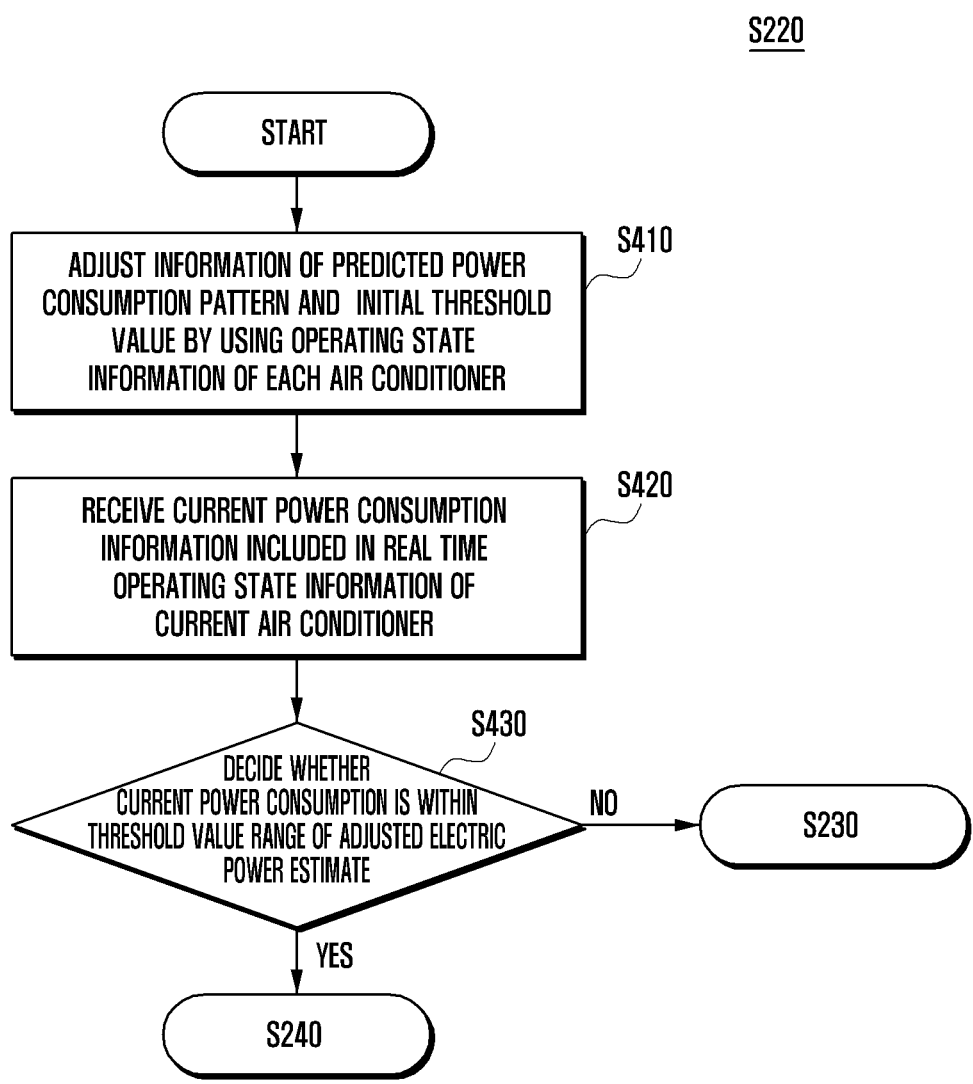
FIG. 4 is a flowchart illustrating a method of managing power consumption by a power consumption managing device, according an embodiment of the present invention.

FIG. 4 is a flowchart illustrating a method of managing power consumption by a power consumption managing device at step S220, according an embodiment of the present invention.

The power consumption managing device 120 modifies the predicted power consumption pattern and the calculated threshold value versus time of the power consumption pattern by using operating state information of each air conditioner in the building at step S410. The power consumption managing device 120 can receive the operating state information from the air conditioner 110. By receiving the operating state information of the air conditioner 110, the power consumption factor (i.e., information of a building) can be modified by considering characteristics of each air conditioner in the building.

The power consumption managing device 120 can extract a power consumption pattern from the external server 130 based on the operating state information of the air conditioner 110. The power consumption managing device 120 can adjust a threshold value of the predicted power consumption based on the extracted power consumption pattern of the air conditioner 110. For example, if the extracted power consumption pattern based on the operating state information of the air conditioner 110 exceeds a threshold value of the predicted power consumption pattern versus time, the threshold value of the power consumption pattern versus time can be adjusted by calculating an average value of the extracted power consumption pattern based on the threshold value and the operating state information of the air conditioner 110.

Further, the power consumption managing device 120 can adjust the threshold value by considering a threshold value range of the predicted power consumption pattern versus time and determining a reflection ratio of the operating state information of the air conditioner 110. The threshold value range is a difference between the maximum value and the minimum value of the threshold value. If the threshold value range of the predicted power consumption pattern is greater than or equal to the maximum value, it may be determined that the operating state information of the air conditioner 110 doesn't contribute a great influence to the power consumption of the air conditioner 110. Conversely, if the threshold value range of the predicted power consumption pattern is less than the minimum value, it may be determined that the operating state information of the air conditioner contributes a great influence to the power consumption of the air conditioner 110.

As described above, the accuracy of deciding whether the air conditioner 110 is operating in a normal range can be improved by using not only the power consumption factor of the whole building, but also operating state information of individual air conditioners in the building.

The power consumption managing device 120 receives the current power consumption included in the operating state information of a corresponding air conditioner in the building at step S420. The power consumption managing device 120 determines whether the received current power consumption of the air conditioner 110 is included within the threshold value range versus time at step S430, as will be described in more detail with reference to FIG. 5. If the received current power consumption of the air conditioner 110 is not within the threshold value range, the power consumption managing device 120 returns to step S230 of FIG. 2 and transmits a signal informing of abnormal power consumption of the air conditioner 110 to the manager server 140. Further, if the received current power consumption of the air conditioner 110 is included within the threshold value range, the power consumption managing device 120 returns to step S240 and determines whether a check of the air conditioner 110 is required.

When determining whether the received current power consumption of the air conditioner 110 is within the threshold value range versus time at step S430, the power consumption managing device 120 can consider IAQ monitoring for a space of the building including the air conditioner 110 and an influence of a ventilation control according to the monitoring result. For example, if ventilation is performed in the summer time through the IAQ monitoring, such an operation is considered a normal operation even though the power consumption of the air conditioner 110 increased due to a high indoor temperature. However, if the power consumption of the air conditioner 110 is predicted excluding such an influence of ventilation, an error may occur when determining if the conditioner 110 is within the threshold value range versus time because the power consumption of the air conditioner 110 would be out of the threshold value range of the predicted power consumption. In order to solve such a problem, the power consumption managing device 120 can adjust the result of determining a normal condition or an abnormal condition by considering the influence of ventilation.

Figure 5:
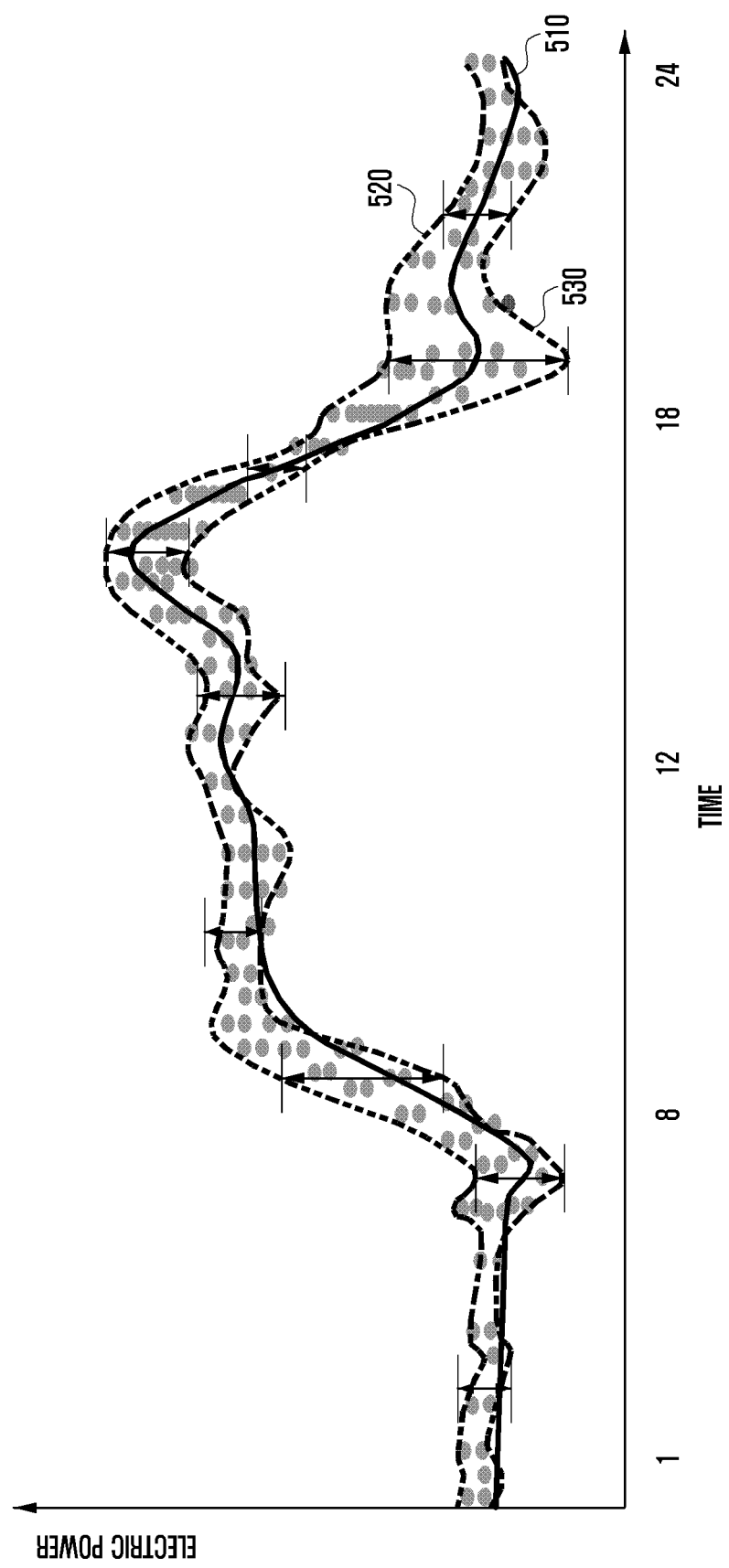
FIG. 5 is a graph of electric power vs. time associated with a method of managing power consumption by a power consumption managing device, according to an embodiment of the present invention.

FIG. 5 is a graph of electric power vs. time associated with a method for managing power consumption by a power consumption managing device, according to an embodiment of the present invention.

In more detail, FIG. 5 illustrates a daily predicted power consumption pattern 510 and corresponding threshold values 520 and 530. This graph has been prepared according to an operation of the power consumption managing device 120 at step S210 of FIG. 2. Namely, at least one power consumption pattern corresponding to a power consumption factor for the time of controlling the air conditioner 110 is extracted from the external server 130 based on the power consumption factor (points versus time are shown in the drawing). A daily power consumption pattern 510 is obtained by calculating an average value of the power consumption according to an extracted time and distribution information (for example, standard deviation) according to the extracted time, and threshold values 520 and 530 are obtained by adding or subtracting to/from the average value. Further, when calculating the power consumption pattern 510 and threshold value 520, the power consumption managing device 120 can apply a weighted value by considering an influence of each power consumption factor to the power consumption.

The power consumption managing device 120 determines whether the current power consumption of the air conditioner 110 is included within the threshold value rage of the predicted power consumption versus time. Namely, it is determined whether the current power consumption value is located between reference numbers 520 and 530 of the graph, as will be described in more detail with reference to FIGS. 6A and 6B.

Figure 6A:
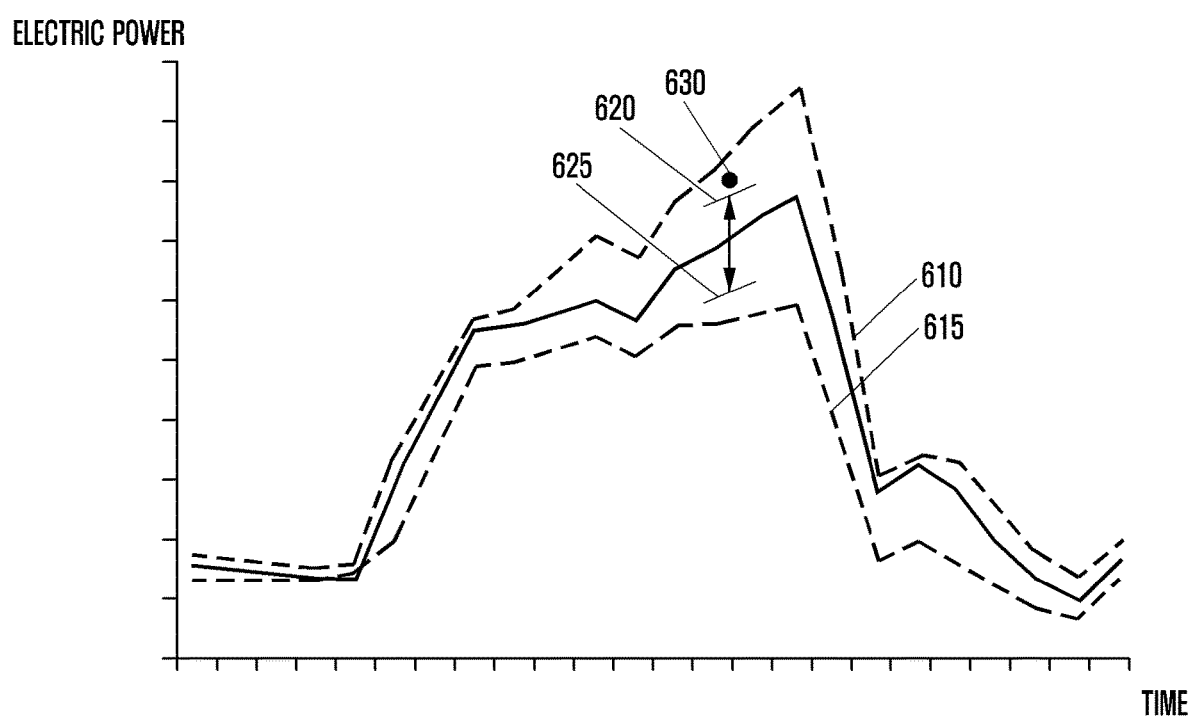
FIGS. 6A and 6B are graphs of electric power vs. time associated with a method of managing power consumption by a power consumption managing device, according to an embodiment of the present invention.
Figure 6B:
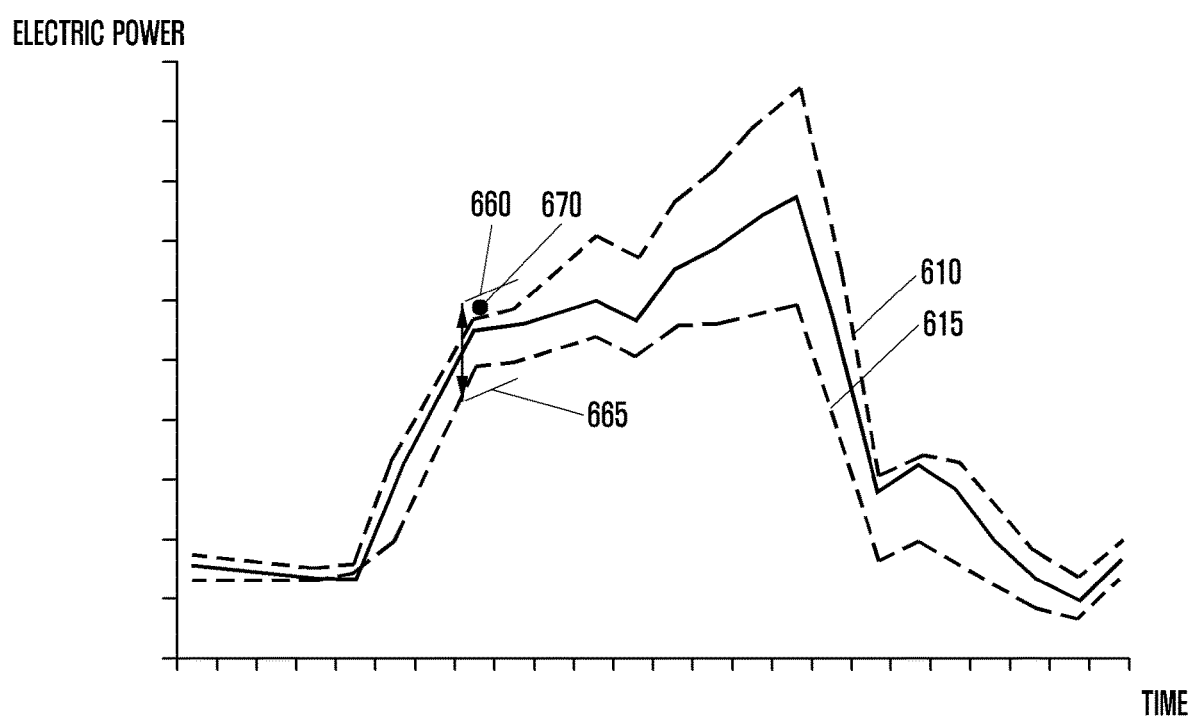

FIGS. 6A and 6B are graphs of electric power vs. time associated with a method of managing power consumption by a power consumption managing device, according to an embodiment of the present invention.

In more detail, FIGS. 6A and 6B illustrate a process of monitoring power consumption of the air conditioner 110 by the power consumption managing device 120 at step S230 of FIG. 2. In FIGS. 6A and 6B, a predicted power consumption pattern, threshold values 610 and 615, fixed critical values 620, 625, 660, and 665 are determined by a conventional methods, and the current power consumption 630 and 670 of the air conditioner 110 are shown. Namely, FIGS. 6A and 6B illustrate a comparison between a method of monitoring power consumption of the air conditioner 110 based on a threshold value according to the present invention and a conventional method of monitoring power consumption of the air conditioner 110 based on a fixed critical value.

In noticing an abnormal power consumption of the air conditioner 110 according to the monitoring, 2 scenarios can be applied. The first scenario may include a false notice or indication, which indicates that an actual state of the air conditioner 110 is normal, but in actuality the air conditioner 110 is in an abnormal state, as shown in FIG. 6A. Namely, the current power consumption 630 of the air conditioner 110 is determined to be in an abnormal state because it exceeds the maximum value 620 of the fixed critical values defined according to the conventional method; however the actual state should be identified as a normal state because the current power consumption 630 is located within a predicted threshold range between reference numbers 610 and 615 if comprehensively considering the current power consumption factors. For example, in a case where an indoor temperature is increased and power consumption of the air conditioner 110 is increased due to many occupants in a building, the operating state of the air conditioner 110 can be determined to be in an abnormal state because the conventional method doesn't reflect such a situation. Here, the power consumption managing device 120 transmits a command signal to the air conditioner 110 to shut down electric power of the air conditioner 110 by digitalizing the extent of abnormality if the power consumption is greater than a specific critical value. Therefore, the occupants in the building may be made uncomfortable due to the decrease in power to the air conditioner 110, and a problem may be generated because of the time, cost, and effort needed for increasing power to the air conditioner 110 so that a building can be brought to a comfortable temperature.

As another example, a problem of identifying the normal state as an abnormal state may be generated because the air conditioner 110 does not correspond to a pattern change due to performance deterioration.

The second case may include, for example, an undetected alarm. This case indicates that the actual state is abnormal but it has been determined that the air conditioner 110 is in a normal as shown in FIG. 6B. Namely, the current power consumption 670 of the air conditioner 110 is determined to be in a normal state because it is within the maximum value 660 of fixed critical values defined according to the conventional method. For example, when predicting the power consumption based on the power consumption factor, the threshold value range in a specific time period may be narrow. In this case, although the air conditioner 110 is operating in an abnormal state because the power consumption 670 exceeds the maximum value 610 due to an energy leak, such as opening a window in a specific time period, the operating state of the air condition 110 is determined to be in a normal state because the power consumption is still within the maximum value 660 of the pre-fixed critical value. In this case, the abnormal state goes undetected, and continuous energy loss is generated and problems of wasting an electric power and danger of fire can be caused.

Therefore, in accordance with the present invention, by predicting the power consumption according to power consumption factors influencing the power consumption, various factors are reflected to the management of power consumption and the accuracy and reliability in deciding a normal or abnormal operating state can be improved.

Figure 7:
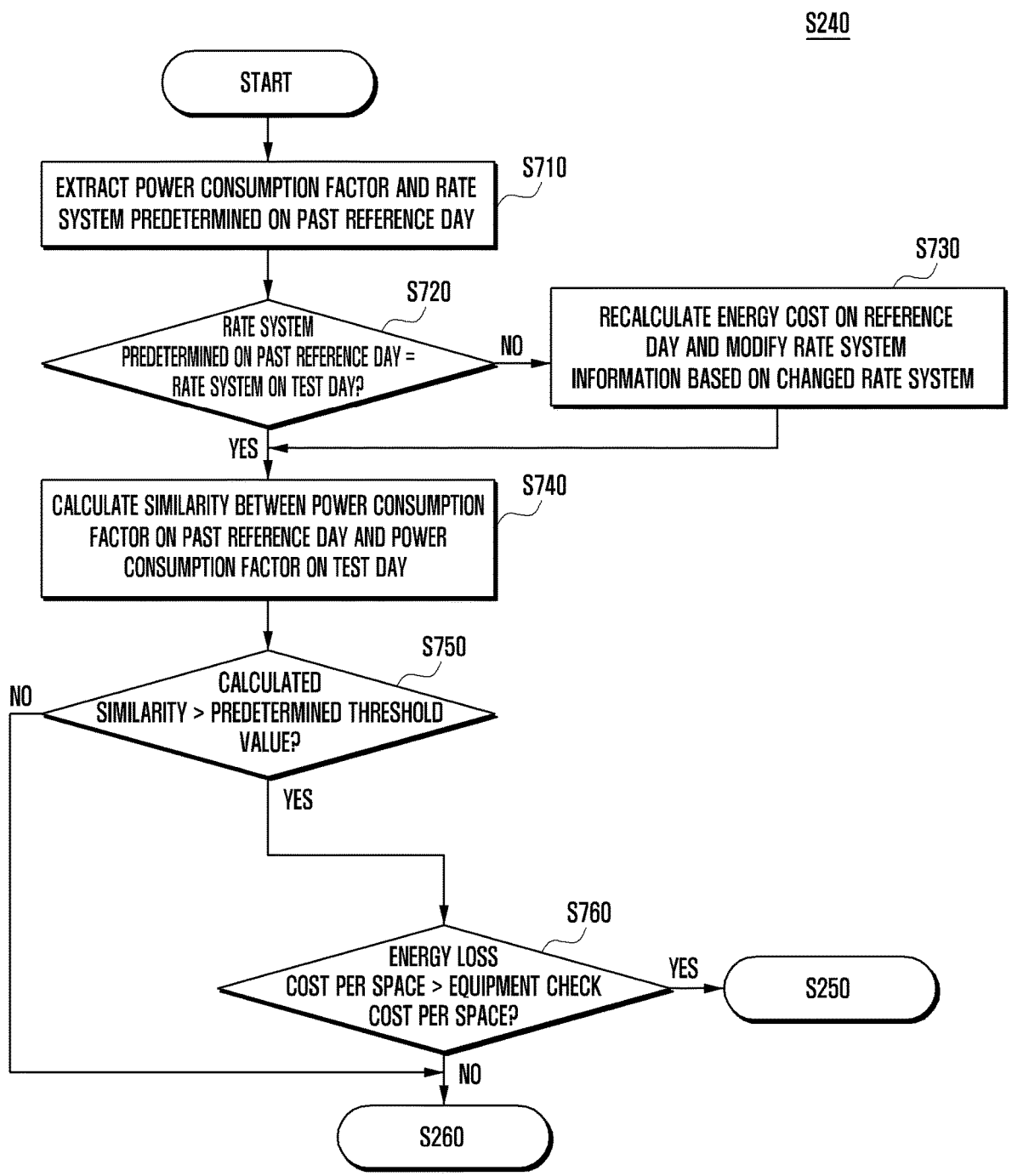
FIG. 7 is a flowchart illustrating a method of identifying whether a check of an air conditioner is required for a power consumption managing device, according to an embodiment of the present invention.

FIG. 7 is a flowchart illustrating a method of identifying whether checking of the air conditioner 110 is required for a power consumption managing device at step S240, according to an embodiment of the present invention.

The power consumption managing device 120 extracts information of a power consumption factor and a rate system on a predetermined reference day from the external server 130 at step S710. For example, the predetermined reference day may include the time of installing the air conditioner 110. The time of installing the air conditioner is used a base time to calculate how much change has been generated by comparing the initial performance of the air conditioner 110 with a current performance of the air conditioner 110.

The power consumption managing device 120 determines whether a rate system on the reference day is identical to a rate system on the test day at step S720. If the rate system on the reference day is different from the rate system on the test day, the power consumption managing device 120 can recalculate an energy cost on the reference day and modify the rate system on the test day based on the recalculation at step S730.

If the rate system on the reference day is identical to the rate system on the test day at step the S720 or the rate system has been changed based on the recalculation at step S730, the power consumption managing device 120 calculates a similarity between the power consumption factor on the reference day and the power consumption factor on the test day at step S740. As an example of calculating the similarity, a distance between the power consumption factors of the reference day and the test day may be calculated to determine the similarity. The calculation may be performed by using Equation (1).

$$d = \sqrt{(x_1 - y_1)^2 + (x_2 - y_2)^2 + (x_3 - y_3)^2 + (x_4 - y_4)^2 + \ldots} \quad (1)$$

In Equation (1), $x_1$, $x_2$, $x_3$, and $x_4$ indicate each power consumption factor on the reference day, and $y_1$, $y_2$, $y_3$, and $y_4$ indicate each power consumption factor on the test day. The method of calculating a distance value is introduced to digitalize the difference value between the power consumption factors. The power consumption managing device 120 may use the Equation (2) to determine the similarity by using the calculated distance value.

$$S = \frac{1}{1+d} (0 \le d < \infty) \quad (2)$$

In Equation (1), d indicates the calculated distance value. For example, if the distance values calculated by using Equation (1) are 3 and 19, the similarities can be calculated respectively to 0.25 and 0.05 by using Equation (2). Accordingly, the time point having the distance value 3 can be identified to have a higher similarity to the power consumption factor of the reference day. The reason why the similarity is calculated in such a manner is because the distance value range is not constant but the similarity satisfies a range 0<S<1, and thereby the similarity can be more easily identified by uniformly digitalizing. However, the above method of calculating the similarity is merely an example, and various other methods for calculating the similarity can be used.

The power consumption managing device 120 determines whether the calculated similarity is greater than a predetermined critical value at step S750. The power consumption managing device 120 can determine whether a check of the air conditioner 110 is required based on the similarity. In the disclosed example, the similarity range is 0≤S≤1, and the critical value is defined from 0-1. If the similarity is greater than the critical value, the power consumption factor of the test day is determined to be similar to that of the reference day and, thus, didn't change significantly from the power consumption factors of the reference day. Accordingly, an energy loss cost for each space on the test day can be calculated easily by comparing the cost of the test day with the cost of the reference day. The cost can be calculated in order to determine whether a check of the air conditioner 110 is required. Further, if the calculated similarity is less than the predetermined critical value, the power consumption managing device 120 proceeds to step S260 of FIG. 2, and identifies whether the power consumption factor changed in order to determine whether to update the predicted power consumption pattern and the threshold value.

If the similarity calculated at step S750 is greater than the predetermined critical value, the power consumption managing device 120 determines whether an energy loss cost per space is greater than an equipment check cost per space at step S760. The power consumption managing device 120 can receive information of the equipment check cost per space from the external server 130. The equipment check cost has a predetermined value. The equipment check cost can be calculated by using an index of equipment performance deterioration. The index of equipment performance deterioration is an index which reflects the fact that the performance of equipment decreases as the time elapses and never returns to an initial state after checking the equipment, and thereby the check cost becomes higher as the index of equipment performance deterioration becomes higher. The power consumption managing device 120 can calculate the energy loss cost by using the Equation (3).

$$C = (TC_R \times TP_R) - (TC_T \times TP_T) \quad (3)$$

Where C is energy loss cost, TC is a rate in time period, TP power consumption in time period, R a reference day, and T is a test day for checking equipment.

If the energy loss cost calculated by using Equation (3) is greater than the predetermined equipment check cost per space, implementation of an equipment check is determined. In this case, the power consumption managing device 120 returns to step S250 and transmits a request signal for checking an air condition to a manager server. However, if the implementation of the equipment check is not determined at step S750, the power consumption managing device 120 returns to step S260 and identifies whether the power consumption factor changed in order to determine whether to update the predicted power consumption pattern and the threshold value.

Conventionally, the equipment check is performed periodically regardless of an equipment state and charging of an electric rate, and therefore the equipment check cost is unnecessarily increased and/or the energy consumption is increased excessively by missing the equipment check. Accordingly, the power consumption managing device 120 can draw a correct timing of the equipment check by using the above method, and the equipment check cost can be minimized. Further, an unnecessary or excessive check can be avoided by determining the equipment check based on the rate system. Although the power consumption may increase due to deterioration of equipment, in order to maintain the same performance, it may prove more economical not to perform the equipment check if the difference of increased costs is not greater than the equipment check cost. The method of deciding an equipment check based on the rate system is described in more detail with reference to FIGS. 8A and 8B.

Figure 8B:
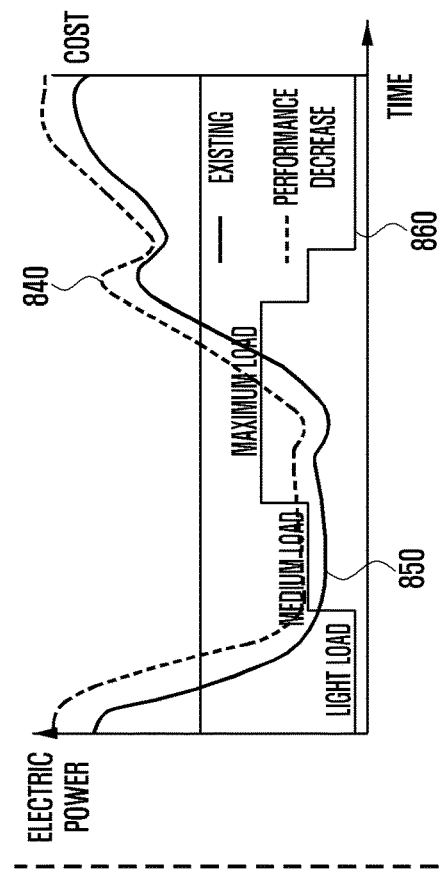
FIGS. 8A and 8B are graphs of electric power vs. time associated with a method of managing power consumption by a power consumption managing device, according to an embodiment of the present invention.
Figure 8A:
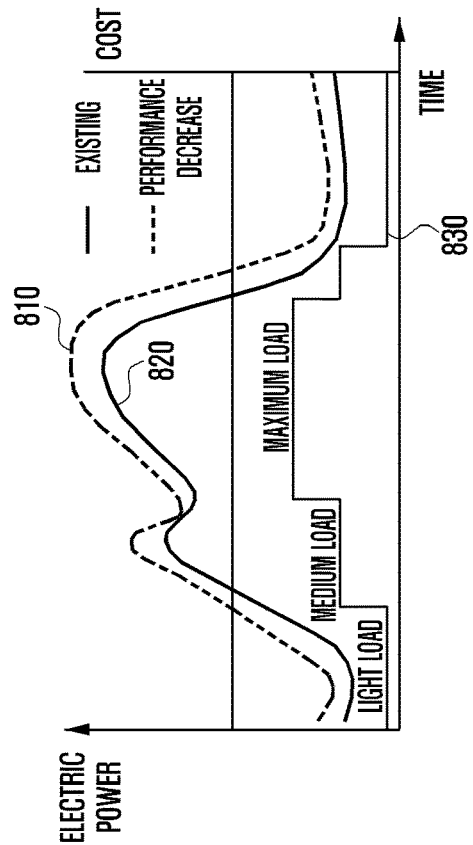

FIGS. 8A and 8B are graphs of electric power vs. time associated with a method of managing power consumption by a power consumption managing device at step S210, according to an embodiment of the present invention.

In more detail, FIGS. 8A and 8B illustrates a method for deciding the equipment check based on a variable rate system. Power consumption of an air conditioner versus time is shown in FIGS. 8A and 8B, in which the existing power consumption 820 and 850 are increased to higher power consumption 810 and 840 to maintain the same output of the air conditioner 110. Here, it is assumed that areas beneath the curves and total power consumption are same in FIGS. 8A and 8B. Further, it is assumed that building space property information, equipment information of air conditioners, performance deterioration speeds of air conditioners, and current performance of air conditioners are same in FIGS. 8A and 8B. If not considering an electricity rate amount of the air conditioner 110 based on the rate system, the equipment check may be determined in both cases. However, if the energy loss cost is calculated based on a variable rate system which charges the rate amount according to a time period at step S760 of FIG. 7, the result of determining the equipment check in both cases can be different and thereby the check period of the air conditioner 110 becomes different. Accordingly, the power consumption managing device 120 can consider economic factors of the equipment check by comparing the indexes of equipment performance deterioration and the equipment check cost, because the energy loss cost may differ according to power consumption in a time period in the variable rate system even though all the other conditions are same.

Figure 9:
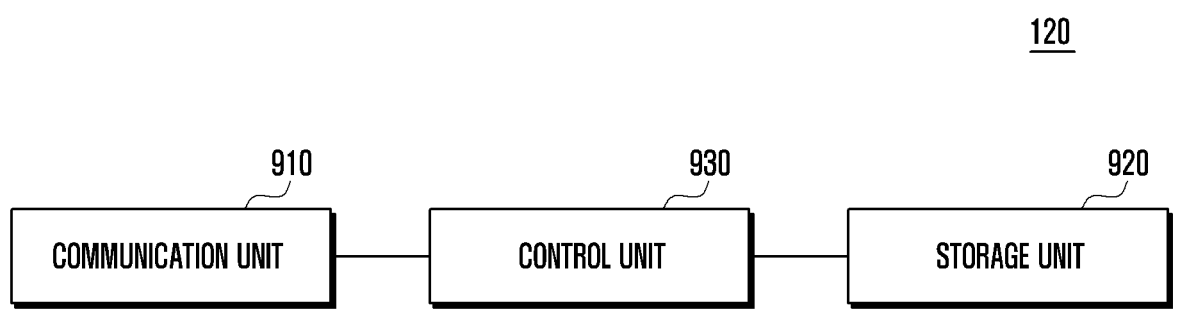
FIG. 9 is a diagram illustrating an internal structure of a power consumption managing device, according to an embodiment of the present invention.

FIG. 9 is a diagram illustrating an internal structure of a power consumption managing device, according to an embodiment of the present invention.

As shown in FIG. 9, the power consumption managing device 120 includes a communication unit 910, storage unit 920, and control unit 930.

The communication unit 910 is connected to the air conditioner 110, external server 130, and manager server 140, and can transmit and/or receive information required for managing power consumption. The communication unit 910 can receive a power consumption factor from the external server 130. Further, the communication unit 910 can receive information of a rate system and an equipment check cost from the external server 130. Further, the communication unit 910 can receive operating state information from the air conditioner 110. Further, the communication unit 910 can receive performance deterioration information from the air conditioner 110.

If the power consumption of the air conditioner 110 exceeds the maximum threshold value versus time of a predicted power consumption pattern by a certain or predetermined amount, the communication unit 910 can directly transmit a power shutdown command to the air conditioner 110. Further, if the power consumption of the air conditioner 110 is not included within a threshold value range of the predicted power consumption pattern, the communication unit 910 can transmit a signal to the manager server 140 in order to inform the manager server 140 of abnormal power consumption of the air conditioner 110. The communication unit 910 can transmit the information received from the control unit 930 to the storage unit 920.

The storage unit 920 can store information required for managing the power consumption. The storage unit 920 can store information of a power consumption factor, rate system, and equipment check cost received from the external server. Further, the storage unit 920 can store information of an operating state and performance deterioration received from the air conditioner 110. The storage unit 920 can receive the information from the control unit 930 through the communication unit 910.

The control unit 930 can control operations required for managing the power consumption by receiving information stored in the storage unit 920 through the communication unit 910. In more detail, the control unit 930 can predict or determine a power consumption pattern of the air conditioner 110 based on at least power consumption factor. Further, the control unit 930 can calculate a threshold value versus the time of power consumption for the predicted power consumption pattern of the air conditioner 110.

Further, the control unit 930 can determine whether the current power consumption of the air conditioner 110 is included within the calculated threshold value range versus time of power consumption. If the current power consumption moves out of the calculated threshold value range versus time of power consumption, the control unit 930 can generate a notice signal and transmit it to the manager server 140.

Further, the control unit 930 can determine whether at least one power consumption factor is changed. If the at least one power consumption factor is changed, the control unit 930 can modify the calculated threshold value of the air conditioner's 110 power consumption by considering a weighted value of the power consumption factor.

Further, the control unit 930 can determine whether rate systems are identical between at least one power consumption factor on a predetermined reference day and at least one power consumption factor on a test day. If the rate systems are identical, the control unit 930 can calculate a similarity between the power consumption factor of the reference day and the current power consumption factor. If the similarity is greater than a predetermined critical value, the control unit 930 can determine whether an equipment check is required based on an energy loss cost calculated according to the rate system and the power consumption in a predetermined time period. If, the equipment check is required, the control unit 930 can control to generate a notice signal and transmit it to the manager server.

In accordance with the embodiments of the present invention, a method and an apparatus for managing the air conditioner 110 determines whether power consumption of the air conditioner 110 is in a normal range by synthetically considering various factor influencing the power consumption of the air conditioner 110, and therefore the air conditioner 110 can effectively managed, as the accuracy and the reliability in the operating state of the air conditioner 110 are improved.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method for managing an air conditioner, the method comprising:
    obtaining information on power consumption of the air conditioner while operating the air conditioner, wherein the power consumption of the air conditioner is affected by at least one power consumption factor;
    identifying a threshold value of power consumption of the air conditioner during a specific time duration based on the information on the power consumption;
    adjusting the threshold value based on operating state information of the air conditioner;
    identifying an allowable range of the power consumption of the air conditioner during the specific time duration based on the adjusted threshold value;
    determining whether the power consumption of the air conditioner during the specific time duration is within the allowable range;
    generating and transmitting a first signal to a manager server if the power consumption of the air conditioner during the specific time duration is not within the allowable range;
    determining whether a check of the air conditioner is required based on the at least one power consumption factor, a rate system for a reference time duration and a rate system for the specific time duration, if the power consumption of the air conditioner during the specific time duration is within the allowable range; and
    transmitting a second signal requesting the check of the air conditioner to the manager server if the check of the air conditioner is required.

2. The method of claim 1, wherein the information on the power consumption is received from an external server based on the at least one power consumption factor.

3. The method of claim 1, wherein determining whether the power consumption of the air conditioner during the specific time is within the allowable range comprises: calculating the power consumption of the air conditioner during the specific time duration based on the operating state information of the air conditioner,
    wherein the operating state information includes at least one of information on a number of users of the air conditioner, information on performance of the air conditioner, or information on an event which occurs during the specific time duration.

4. The method of claim 1, wherein determining whether the power consumption of the air conditioner during the specific time is within the allowable range comprises:
   detecting a change in the at least one power consumption factor if a space having the air conditioner is ventilated with a ventilation system; and
   adjusting a result of determining whether the power consumption of the air conditioner during the specific time is within the allowable range based on the detected change in the at least one power consumption factor.

5. The method of claim 1, further comprising:
   detecting whether the at least one power consumption factor has changed; and
   when the at least one power consumption factor has changed, changing the threshold value of the power consumption of the air conditioner using a weighted value.

6. The method of claim 5, wherein the changed at least one power consumption factor is a result of ventilating a space having the air conditioner.

7. The method of claim 5, wherein using the weighted value comprises:
   calculating a weighted value for each space having the air conditioner, and
   extracting a major power consumption factor for a predetermined number of spaces based on the calculated weighted value.

8. The method of claim 1, wherein determining whether the check of the air conditioner is required further comprises:
   determining whether the rate system for the reference time duration is identical to the rate system for the specific time duration; and
   calculating a similarity between at least one power consumption factor for the reference time duration and the at least one power consumption factor for the specific time duration if the rate system for the reference time duration is identical to the rate system for the specific time duration,
   wherein power consumption of the air conditioner during the reference time duration is determined based on the rate system for the reference time duration and the power consumption of the air conditioner during the specific time duration is determined based on the rate system for the specific time duration if the calculated similarity is greater than a predetermined value.

9. The method of claim 1, wherein determining whether the check of the air conditioner is required further comprises:
   if the power consumption during the specific time duration is not within the allowable range, determining whether an equipment check is required based on an energy loss cost, wherein the energy loss cost is calculated based on a difference between a power consumption during the reference time duration and the power consumption during the specific time duration; and
   wherein transmitting the second signal further comprises generating and transmitting the second signal to the manager server if the equipment check is required.

10. The method of claim 9, wherein determining whether the equipment check is required comprises comparing the energy loss cost with an equipment check cost.

11. The method of claim 1, wherein the air conditioner is one of an air cooling conditioner, an air heating conditioner, and an air ventilating conditioner.

12. An apparatus for managing an air conditioner, the apparatus comprising:
   at least one non-transitory computer-readable medium; and
   at least one processor which, when executing instructions stored on the at least one non-transitory computer-readable medium, implements:
   a communication unit configured to transmit and receive information; and
   a control unit configured to:
      obtain information on power consumption of the air conditioner while operating the air conditioner, wherein the power consumption of the air conditioner is affected by at least one power consumption factor;
      identify a threshold value of power consumption of the air conditioner during a specific time duration based on the information on the power consumption;
      adjust the threshold value based on operating state information of the air conditioner;
      identify an allowable range of the power consumption of the air conditioner during the specific time duration based on the adjusted threshold value;
      determine whether the power consumption of the air conditioner during the specific time duration is within the allowable range;
      generate and transmit a first signal to a manager server if the power consumption of the air conditioner during the specific time duration is not within the allowable range;
      determine whether a check of the air conditioner is required based on the at least one power consumption factor, a rate system for a reference time duration and a rate system for the specific time duration, if the power consumption of the air conditioner during the specific time duration is within the allowable range; and
      transmit a second signal requesting the check of the air conditioner to the manager server if the check of the air conditioner is required.

13. The apparatus of claim 12, wherein the information on the power consumption is received from an external server based on the at least one power consumption factor.

14. The apparatus of claim 12, wherein the control unit is further configured to: calculate the power consumption of the air conditioner during the specific time duration based on the operating state information of the air conditioner,
   wherein the operating state information includes at least one of information on a number of users of the air conditioner, information on performance of the air conditioner, or information on an event which occurs during the specific time duration.

15. The apparatus of claim 12, wherein the control unit is further configured to:
   detect a change in the at least one power consumption factor if a space having the air conditioner is ventilated with a ventilation system; and
   adjust a result of determining whether the power consumption of the air conditioner during the specific time is within the allowable range based on the detected change in the at least one power consumption factor.

16. The apparatus of claim 12, wherein the control unit is further configured to:

detect whether the at least one power consumption factor has changed; and when the at least one power consumption factor has changed, change the threshold value of the power consumption of the air conditioner using a weighted value.

17. The apparatus of claim 16, wherein the changed at least one power consumption factor is a result of ventilating a space having the air conditioner.

18. The apparatus of claim 16, wherein the control unit is further configured to:

calculate a weighted value for each space having the air conditioner; and extract a major power consumption factor for a predetermined number of spaces based on the calculated weighted value.

19. The apparatus of claim 12, wherein the control unit is configured to determine whether an equipment check is required by comparing an energy loss cost with an equipment check cost by:

determining whether the rate system for the reference time duration is identical to the rate system for the specific time duration; and calculating a similarity between at least one power consumption factor for the reference time duration and the at least one power consumption factor for the specific time duration if the rate system for the reference time duration is identical to the rate system for the specific time duration, wherein power consumption of the air conditioner during the reference time duration is determined based on the rate system for the reference time duration and the power consumption of the air conditioner during the specific time duration is determined based on the rate system for the specific time duration if the calculated similarity is greater than a predetermined value.

20. The apparatus of claim 12, wherein the control unit is further configured to:

if the power consumption during the specific time duration is not within the allowable range, determine whether an equipment check is required based on an energy loss cost, wherein the energy loss cost is calculated based on a difference between a power consumption during the reference time duration and the power consumption during the specific time duration; and generate and transmit the second signal to the manager server if the equipment check is required.

21. The apparatus of claim 20, wherein the control unit is further configured to:

compare the energy loss cost with an equipment check cost.

22. The apparatus of claim 12, wherein the air conditioner is one of an air cooling conditioner, an air heating conditioner, and an air ventilating conditioner.

* * * * *